Aug. 28, 1934.  P. A. BORDEN ET AL  1,971,764
ELECTRICAL CONTROL SYSTEM
Filed Oct. 22, 1932

INVENTORS
PERRY A. BORDEN AND
BY WALTER N. HUBBARD
ATTORNEY

Patented Aug. 28, 1934

1,971,764

UNITED STATES PATENT OFFICE 1,971,764

ELECTRICAL CONTROL SYSTEM

Perry A. Borden, Waterbury, and Walter N. Hubbard, Meriden, Conn., assignors to The Bristol Company, Waterbury, Conn., a corporation of Connecticut Application October 22, 1932, Serial No. 639,032

13 Claims. (Cl. 175—320)

The invention relates to relay apparatus, for example as embodied in electrical control systems, and more especially to those utilizing an alternating current for the operation of a moving-element reactive-factor-responsive device.

The novel system and apparatus herein disclosed is especially suited to remote control such as the selective operation of a motor-controlled valve or other motor-actuated device; also, for the indication at one point of conditions existing at a point remote therefrom.

It has for an object to effect such control and/or indication through the use of a transmitting or operating line or circuit embodying but two conductors; also, the provision of a system embodying an electrical device responsive solely to the phase-angle position of current prevailing in this line as related to the supply voltage, rendering thereby the said system independent of variations of line resistance as well as of the voltage of the said supply, and admitting of the provision of a multiplicity of control points.

A further object of the invention is to afford a system of this nature which does not require the location of a source of power supply at the transmitting end of the operating line; also, a system in which the value of the operating current utilized may be relatively small.

Still another object of the invention resides in the provision of a system of the aforesaid nature which will admit of superimposing other currents upon the transmitting or operating line, as for communication and other purposes.

In carrying out the invention, a local circuit is controlled by an electrosensitive device such as a reactive factor relay which is responsive to the phase-position of an alternating current flowing in a controlling electric circuit, there being adapted to be included at will in said circuit at the control point, remote from the relay, one of a multiplicity of impedances having differing characteristic phase angles.

The electromagnetic circuit of the relay, if of the electrodynamic type, is to this end made highly inductive so that the flux in which its moving coil operates is practically in quadrature with the applied voltage, and a shading coil may be associated therewith to insure true quadrature. Current in phase with this voltage and flowing in the moving coil of the device will, therefore, not produce any torque in the relay. However, through the introduction of the selected impedance, the value of the out-of-phase component is varied and the relay device will be caused to respond.

In the use of an electrosensitive device embodying a relay of the induction type, the action is similar except that the flux produced by the exciting coil of the relay is caused to be in phase with the applied voltage so that the eddy currents set up in the moving element of the relay and the flux produced thereby are in quadrature with the applied voltage.

The nature of the invention, however, will best be understood when described in connection with the accompanying drawing, in which.

Figure 1:
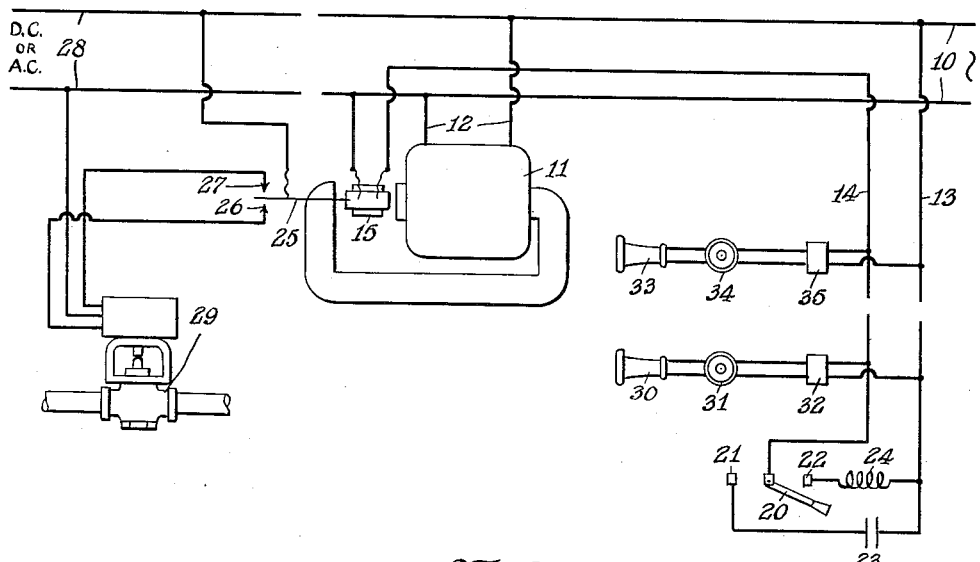
Fig. 1 is a diagrammatic view illustrating the arrangement and electrical connections of the various parts constituting the novel control system and relay thereof.

Referring to the drawing, 10 designates power mains as a source of alternating current, and 11 an electro-sensitive device to be located at the receiving station, this device being of the nature of a reactive factor relay of the electrodynamic type and receiving its exciting current directly from the mains 10 through leads 12. The term "reactive factor" as used herein and as defined by the Standardization Rules of the American Institute of Electrical Engineers is understood as "the sine of the angular phase displacement between the voltage and the current." A reactive factor relay is therefore to be understood as a relay in which the actuating torque is substantially proportional in sign and intensity to the sine of the phase angle between the current in its operating coil and the voltage applied to its exciting coil rather than to the cosine of that angle as is common in most electrodynamic devices. Also, the phase angle characteristic of the circuit, or characteristic phase angle, it will be understood, is inseparably associated with the "time constant" of that circuit so that when an alternating voltage of frequency ($f$) is impressed upon a circuit having a resistance (R), an inductance (L) and a capacitance (C), the current which flows in the circuit will differ in phase from the applied voltage by an angle ($\theta$) in accordance with the formula $$\theta = \tan^{-1} \frac{(2\pi fL) - \left(\frac{1}{2\pi fC}\right)}{R}$$

This angle $\theta$ corresponds to the term "phase angle characteristic" herein used; and it will be observed that neither the voltage nor the current appears in the expression. Assuming, therefore, a constant frequency on the system, the only variables which appear are inductance, capacitance and resistance, all of which are physical characteristics dependent upon the material, dimensions and geometrical configuration of the circuit. Variations in these constants is made use of in the control of the relay device 11, as hereinafter set forth.

To this end, leads 13 and 14 connect the moving coil 15 of the relay also with the supply main 10, the said coil being included in series with said supply main through means for introducing selected impedances and located at the transmitting station. The electromagnetic circuit of the relay is made highly inductive so that the flux in which the moving coil 15 operates is practically in quadrature with the applied voltage. The two said leads 13 and 14, it is to be observed, constitute in the present system the transmitting or operating lines or control circuit and are the only connections required between the receiving station at which the reactive factor relay 11 is located and the transmitting station having suitable transmitting means or device for introducing selected impedances of predetermined value for altering the quadrature relationship between the flux in which the moving coil is maintained and the current flowing in the coil. For example, a double-throw single-pole switch embodying the movable contact blade 20 and contacts 21 and 22 is arranged to be included in series with the control circuit 13, 14. Impedances such as the condenser 23 and inductance 24 are connected respectively to the contacts 21 and 22 and both to the lead 13, the blade 20 being connected to the lead 14. Thereby, in accordance with the position of blade 20, whether engaging contact 21 or contact 22, will a capacitative or an inductive impedance be included in the controlling circuit and in series with the moving coil 15. This will serve to unbalance the phase relationship aforesaid, the introduced out-of-phase component of current causing the moving coil of the relay to be deflected in one direction or the other depending upon whether the current leads or lags the applied voltage.

Moving coil 15, through a movable arm 25 associated therewith, is caused to engage one or the other of the relay contacts 26, 27, accordingly as a contact 21 or 22 is engaged by the movable blade 20, through the disturbance in phase relationship, as aforesaid.

The contacts 26, 27 in conjunction with the arm 25 of the relay are designed to control a local circuit energized, as from the main 28, in manner well understood. Such local circuit may operate, for example, a motor-controlled valve 29 to open or to close the same as one or the other of the contacts 26, 27, respectively, is engaged by the arm 25.

Thus, the valve 29 may be controlled from a remote point through the operation of blade 20; and it will be observed, furthermore, that no source of power is required at this point of control, the energy for the relay circuit being provided at the place where said relay is located and which is generally in proximity to the location of valve 29.

Moreover, as is hereinbefore noted, the controlling circuit is not affected by a direct current impressed thereon nor by an alternating current differing materially in frequency from that of the relay-operating current. It becomes possible thus to superimpose other controlling or communicating currents thereon. For example, a telephone circuit represented by the receiver 30 and transmitter 31 may be connected to the leads 13, 14 through a suitable filter device 32; and similar telephone apparatus, 33, 34 and 35 may be connected to the operating line at the relay end thereof.

Figure 2:
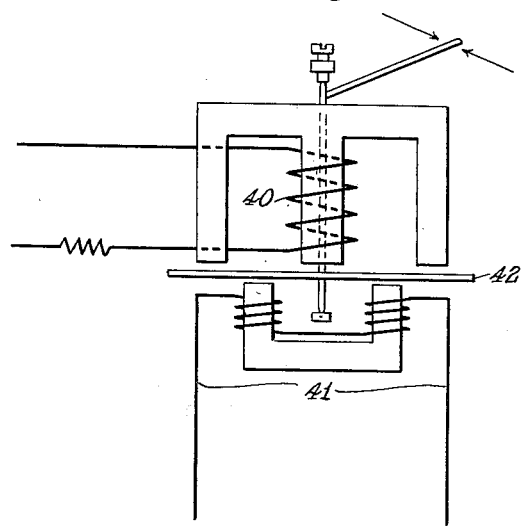
Fig. 2 is a detail elevation of a different form of relay which may be employed in the novel system.

Furthermore, the particular relay herein illustrated is not essential to the operation of the system, but other electrosensitive devices may be utilized. For example, a relay of the induction type, as indicated in Fig. 2 of the drawing, will operate satisfactorily. This relay may comprise an exciting coil 40 and working coil 41 associated therewith, with intermediate rotatable metallic disc 42 in which secondary eddy currents are induced in quadrature with the applied voltage of the exciting coil and resultant exciting coil flux.

The field produced by current in the working coil in phase with the applied voltage will also be in quadrature with the field produced by the induced currents in the disc, causing no accumulative torque effect in the disc.

Fields produced by current in the working coil out of phase with the exciting coil voltage and flux do not have a quadrature relationship with the fields produced by the eddy currents in the disc thereby producing a resultant torque, the direction of which will depend upon the phase relationship of the working coil current and the eddy currents in the disc, whether leading or lagging. Said working coil is therefore connected with the selected impedances for unbalancing the phase relationship, as hereinbefore set forth.

We claim:

1. In a control system: a source of alternating current, a two-conductor controlling circuit, a moving-coil electroresponsive device of the reactive-factor type energized in part directly from the source of alternating current and in part indirectly therefrom through the controlling circuit, and means to alter the phase-angle characteristic of the said controlling circuit.

2. In a control system: a source of alternating current, a two-conductor controlling circuit, a moving-coil electroresponsive device of the reactive-factor type including means affording a field energized from the source of alternating current and an element included in and energized by the controlling circuit from said source to effect a response of the electroresponsive device, and means to alter the phase-angle characteristic of the controlling circuit.

3. In a control system: a source of alternating current, a two-conductor controlling circuit, a moving-coil electroresponsive device of the reactive-factor type including means affording a field energized from the source of alternating current and a movable element included in and energized by the controlling circuit from said source to effect a response of the electroresponsive device, and means to alter the phase-angle characteristic of the controlling circuit.

4. In a control system: a source of alternating current, a two-conductor controlling circuit, a moving-coil electroresponsive device of the reactive-factor type including means affording a field energized from the source of alternating current and an element included in series in the controlling circuit and energized thereby from said source to effect a response of the electroresponsive device, and means to alter the phase-angle characteristic of the controlling circuit.

5. In a control system: a source of alternating current, a two-conductor controlling circuit, a moving-coil electroresponsive device of the reactive-factor type including means affording a field energized from the source of alternating current and an element included in and energized by the controlling circuit from said source to effect a response of the electroresponsive device, means to alter the phase-angle characteristic of the controlling circuit, and a local circuit and instrumentalities controlled by said electroresponsive device.

6. In a control system: a source of alternating current, a two-conductor controlling circuit, a moving-coil electroresponsive device of the reactive-factor type including means affording a field energized from the source of alternating current and an element included in and energized by the controlling circuit from said source to effect a response of the electroresponsive device, a plurality of impedances effecting when included in the controlling circuit differing phase-angle characteristics of the current flowing therein, and means for introducing a selected impedance into the controlling circuit to correspondingly affect the response of the responsive device.

7. In a control system: a source of alternating current, a two-conductor controlling circuit, a moving-coil electroresponsive device of the reactive-factor type including means affording a field energized from the source of alternating current and an element included in and energized by the controlling circuit from said source to effect a response of the electroresponsive device, a plurality of impedances of predetermined value effecting when included in the controlling circuit differing phase angle characteristics of the current flowing therein, and means for introducing a selected impedance into the controlling circuit to correspondingly affect the response of the responsive device.

8. In a control system: a source of alternating current, a two-conductor controlling circuit, an electrodynamic relay responsive to alternating current and embodying a moving coil and means affording a field in which the coil moves, the field being energized from said source of alternating current and the flux of said field being substantially in quadrature with the voltage applied, and the moving coil being adapted to be energized from said source through the controlling circuit to effect a response of the relay, and means to alter the phase-angle characteristic of the controlling circuit.

9. In a control system: a source of alternating current, a two-conductor controlling circuit, a moving-coil electro-responsive device of the reactive-factor type including means affording a field energized from the source of alternating current and an element included in and energized by the controlling circuit from said source to effect a response of the electroresponsive device, a capacitance and an inductance, and a switch for connecting at will either the capacitance or the inductance with the controlling circuit to cause a lead or lag respectively of the current-voltage relation.

10. In a control system: a source of alternating current, a two-conductor controlling circuit, a moving-coil electro-responsive device of the reactive-factor type including means affording a field energized from the source of alternating current and an element included in and energized by the controlling circuit from said source to effect a response of the electroresponsive device, a capacitance and an inductance, and a single-pole double-throw switch to one pole of which the capacitance is connected and to the other the inductance, whereby either the capacitance or the inductance may be introduced in series with the controlling circuit to cause a lead or lag respectively of the current-voltage relation.

11. In a constant frequency control system, a source of alternating current, a two-conductor controlling circuit, an electrodynamic relay including means affording a field with a circuit energized from the source of alternating current and an element exposed to said field and included in, and energized through, the controlling circuit, so that the current therein may differ in phase position from that in the field circuit, and means to alter the phase-angle characteristic of the controlling circuit.

12. In a control system, a source of alternating current, a two-conductor controlling circuit, an induction-type relay including means affording a field energized from the source of alternating current, a movable element exposed to said field, an electrical circuit included in, and energized through, the controlling circuit to effect a response of said movable element, depending in direction upon the phase position of the current in said circuits, and means to alter the phase-angle characteristic of the controlling circuit.

13. In a constant frequency control system, a source of alternating current, a two-conductor controlling circuit including means to afford a field, an electromechanical device including means to afford a field, said device being directionally responsive to magnetic reaction between the last-named field substantially in time-quadrature with the voltage of said source and the first-named field produced by current through the controlling circuit, and means to alter the phase-angle characteristic of said controlling circuit.

PERRY A. BORDEN.
WALTER N. HUBBARD.